Dec. 6, 1927.
H. PARKER
1,651,407
PROCESS OF AND MACHINE FOR MAKING FIBER TUBES
Filed May 22, 1924 10 Sheets-Sheet 1
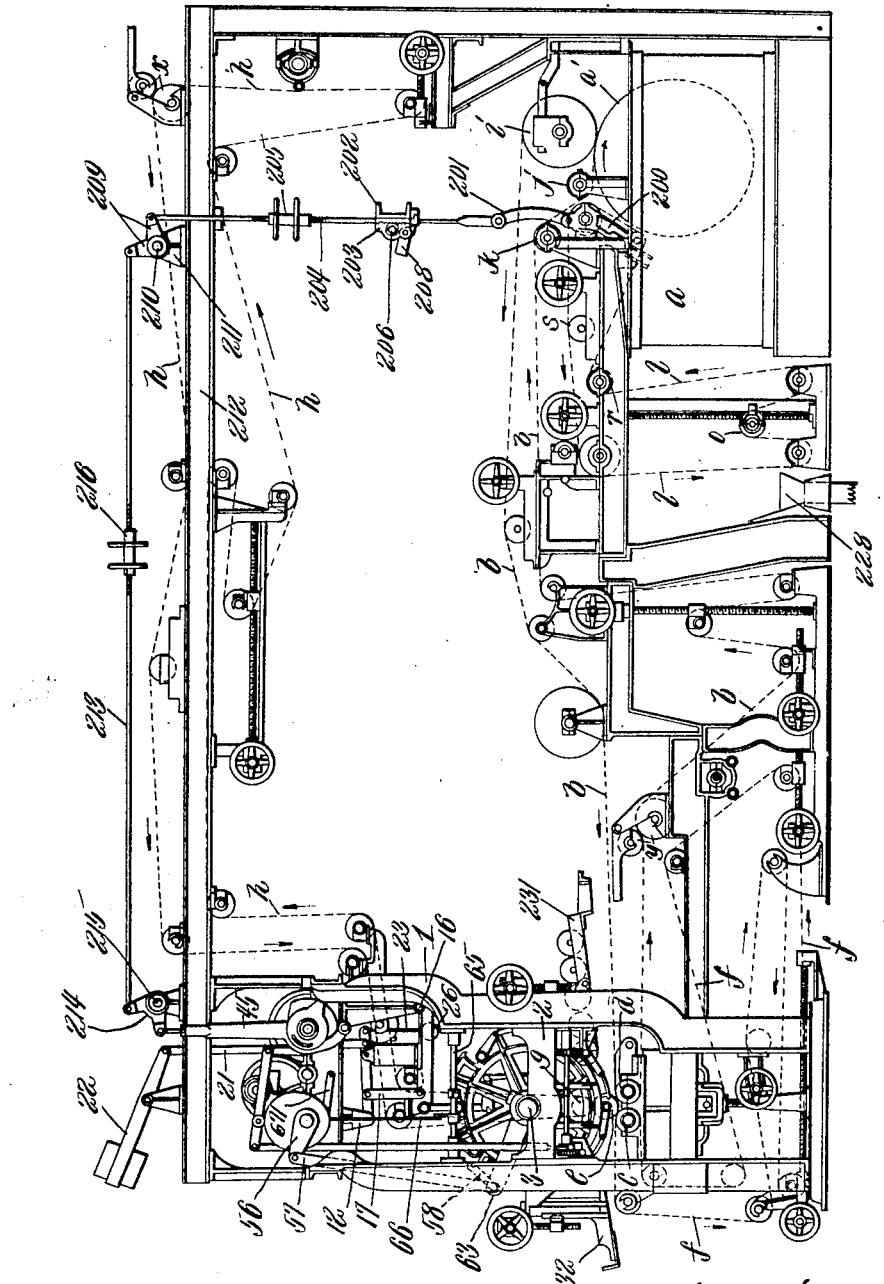

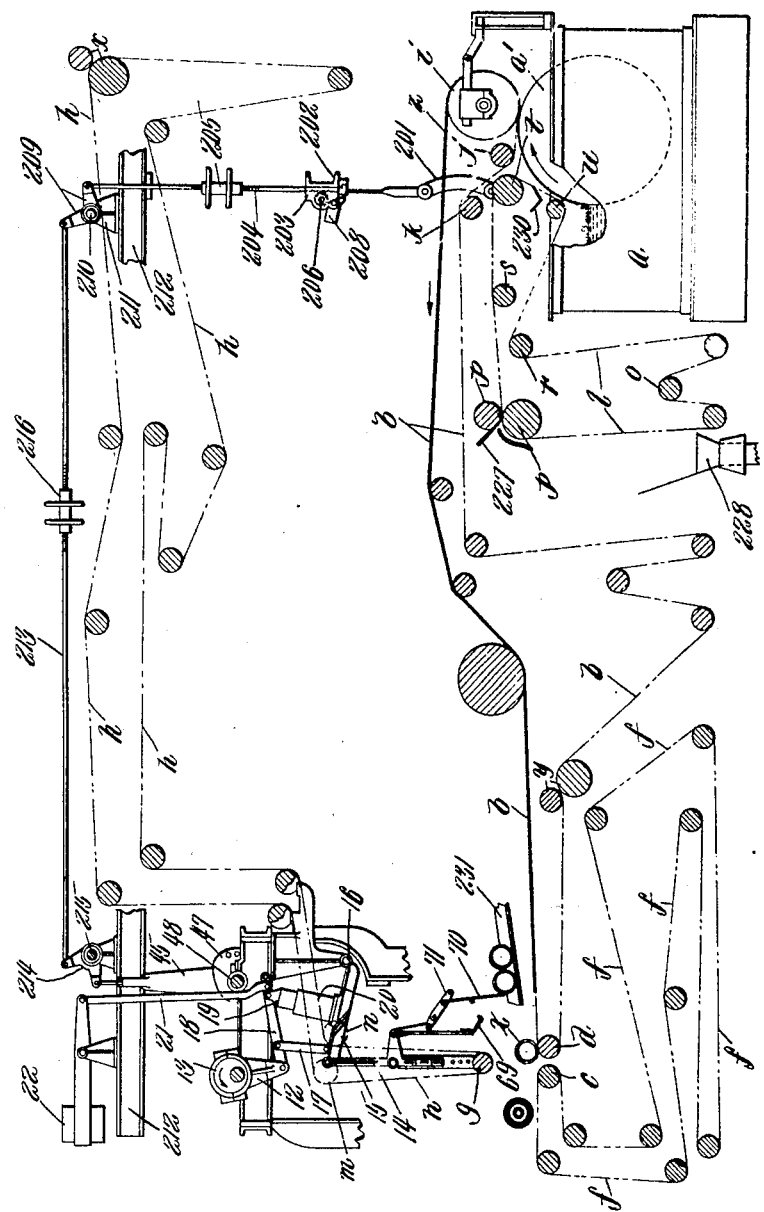

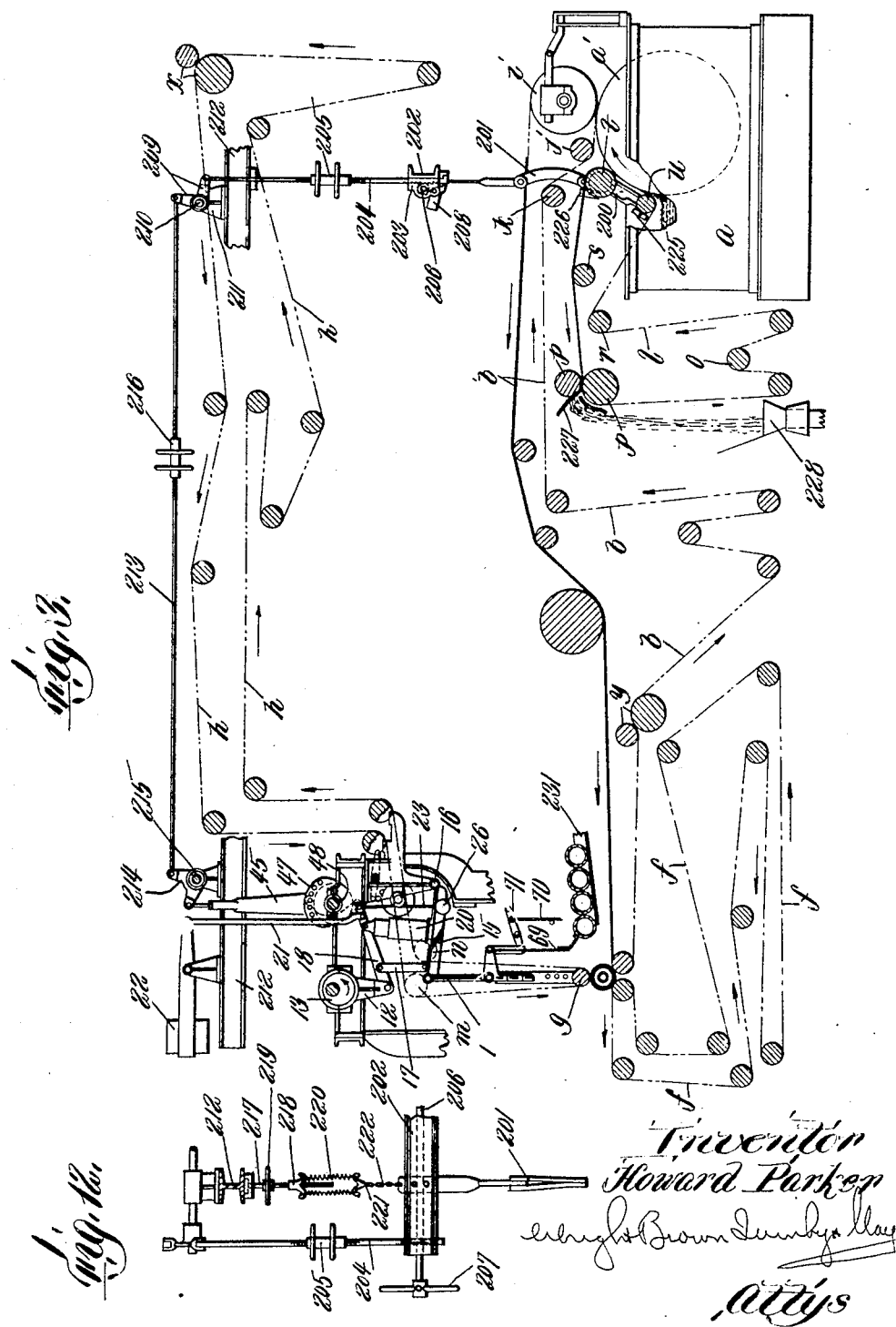

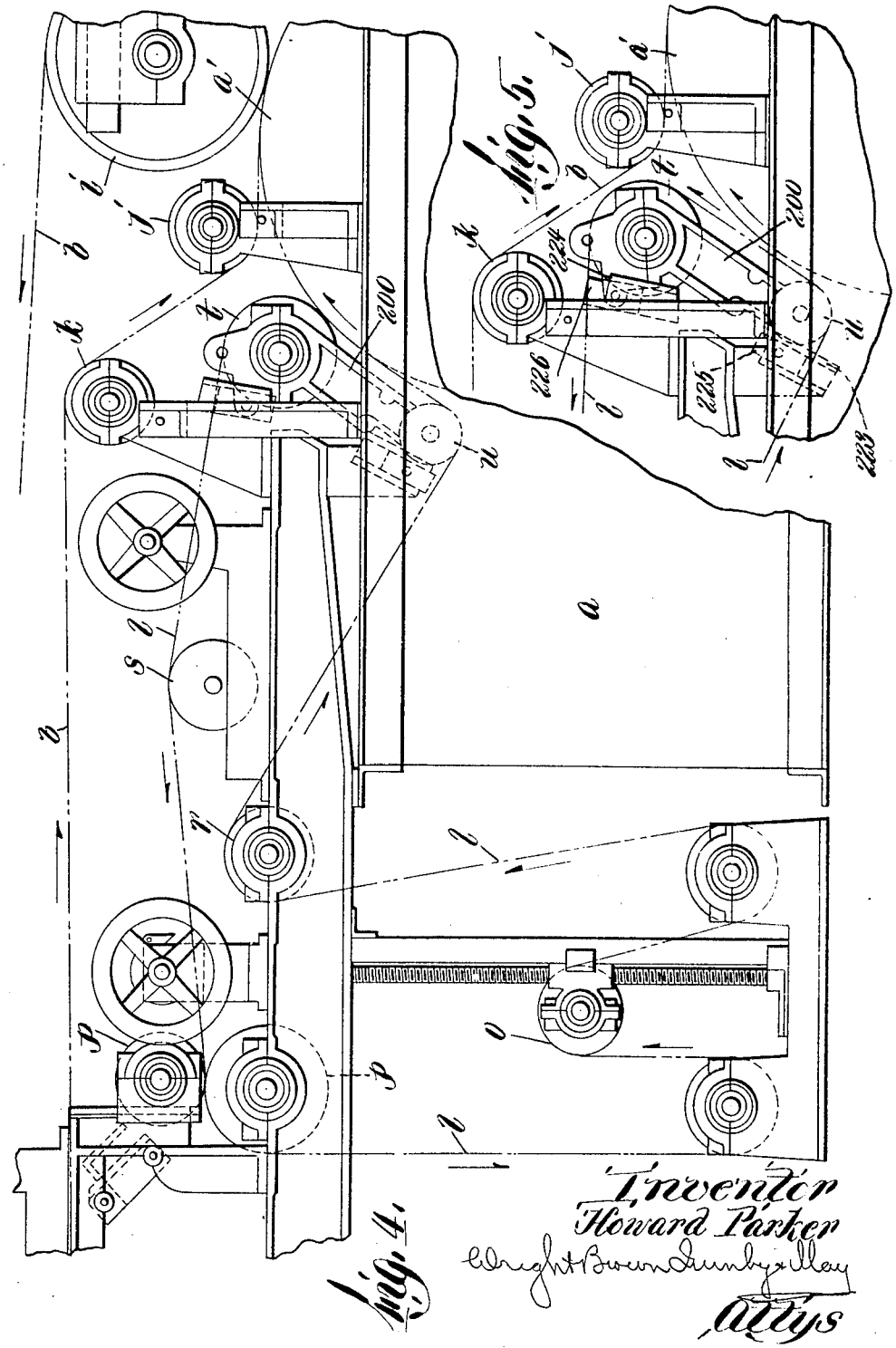

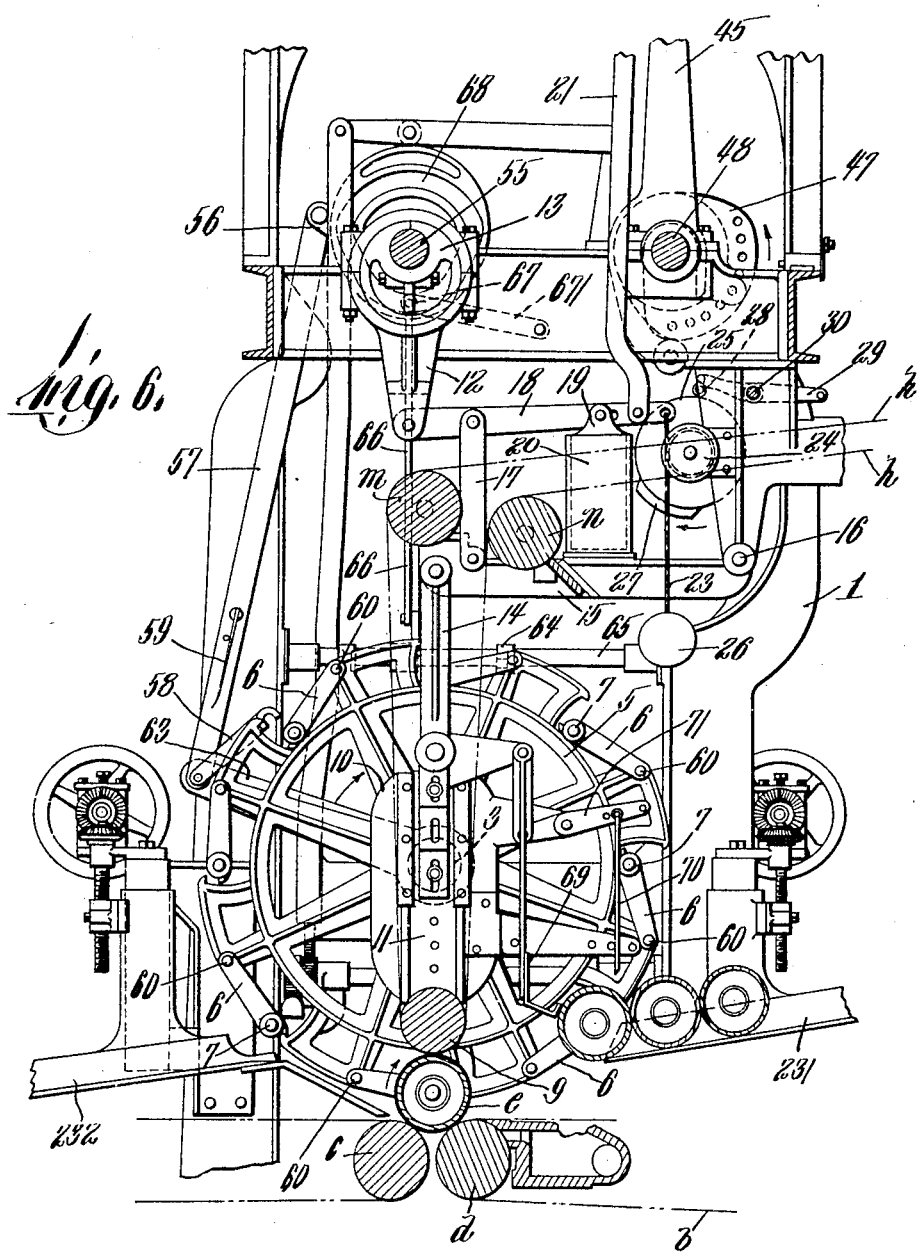

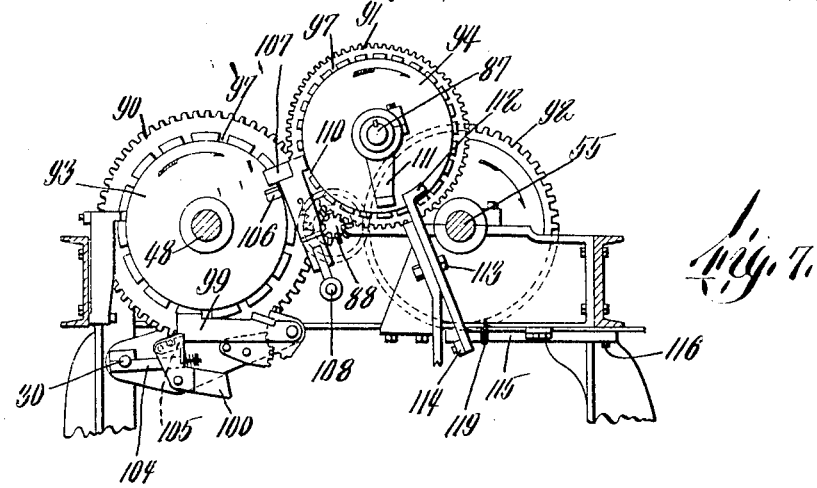

Dec. 6, 1927.
H. PARKER
PROCESS OF AND MACHINE FOR MAKING FIBER TUBES
Filed May 22, 1924
1,651,407
10 Sheets-Sheet 7
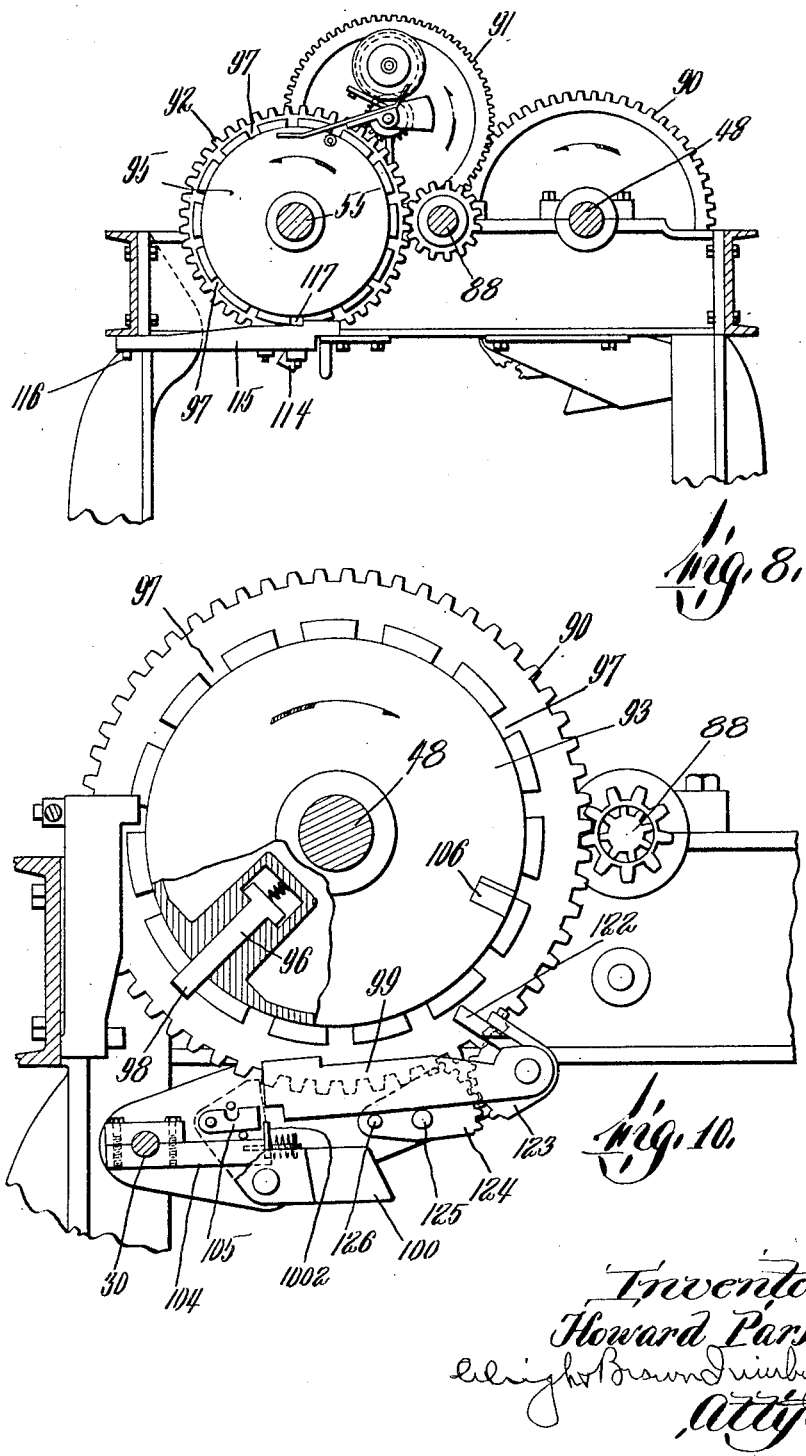
Inventor
Howard Parker
attys Dec. 6, 1927.
H. PARKER
1,651,407
PROCESS OF AND MACHINE FOR MAKING FIBER TUBES
Filed May 22, 1924   10 Sheets-Sheet 8
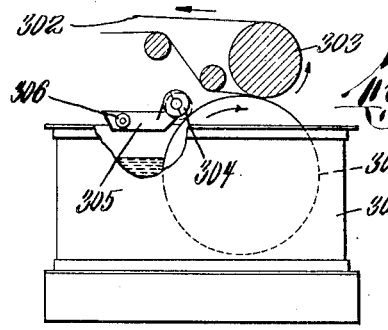
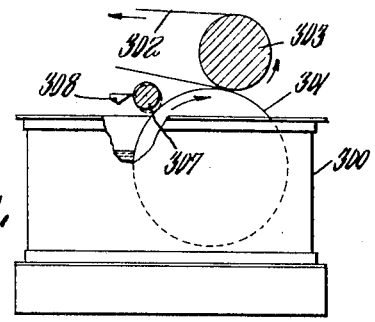
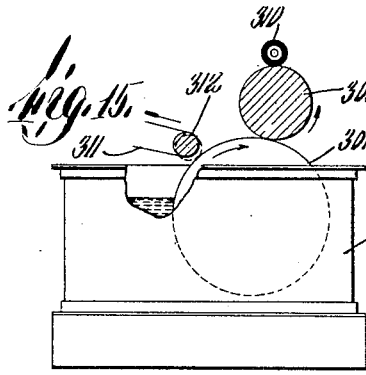
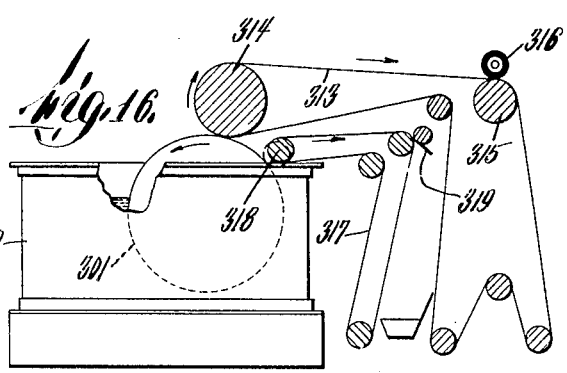
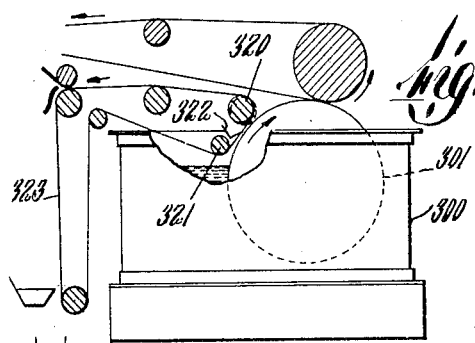
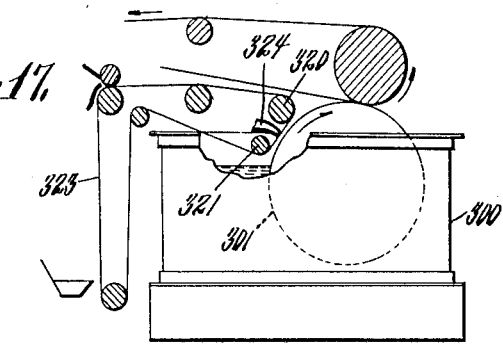
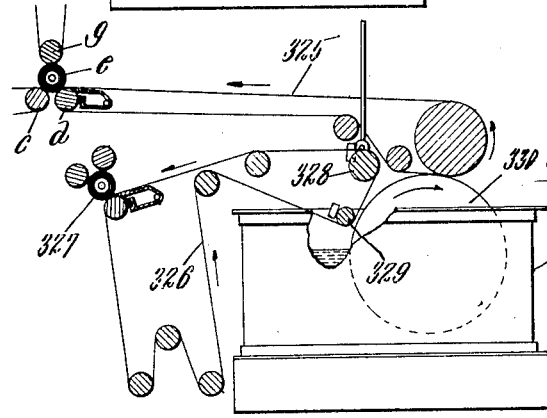

Dec. 6, 1927.　1,651,407
H. PARKER
PROCESS OF AND MACHINE FOR MAKING FIBER TUBES
Filed May 22, 1924　10 Sheets-Sheet 9

Inventor
Howard Parker

Dec. 6, 1927. 1,651,407
H. PARKER
PROCESS OF AND MACHINE FOR MAKING FIBER TUBES
Filed May 22, 1924 10 Sheets-Sheet 10
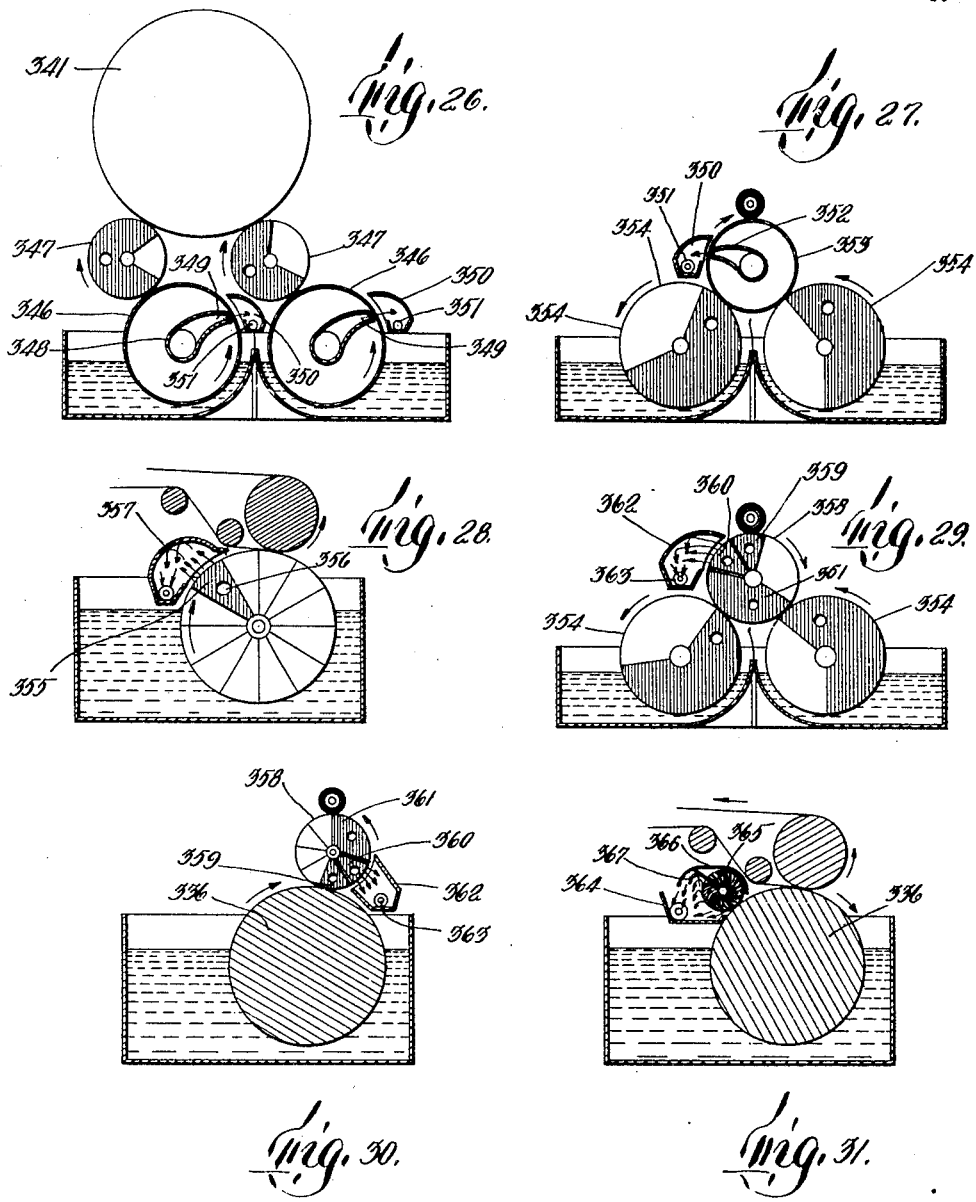

Patented Dec. 6, 1927.

1,651,407

UNITED STATES PATENT OFFICE.

HOWARD PARKER, OF BERLIN, NEW HAMPSHIRE, ASSIGNOR TO BROWN COMPANY, OF BERLIN, NEW HAMPSHIRE, A CORPORATION OF MAINE.

PROCESS OF AND MACHINE FOR MAKING FIBER TUBES.

Application filed May 22, 1924. Serial No. 715,086.

This invention relates to certain inventions or improvements in machines for making tubular bodies by winding a web of wet fibrous pulp about a mandrel. In such machines, as illustrated for example in my Letters Patent No. 1,608,564, the aqueous cellulose pulp is formed in a web and is delivered to a forming mandrel about which it is wrapped or coiled in such manner that a tube is formed which when dried has a homogeneous wall incapable of separation in layers or laminations. In order that the machine may operate continuously and to the best advantage, provision is made for the automatic feeding of the empty mandrels in succession to the forming point or station of the machine and for the automatic removal therefrom of the mandrels and the tubes formed thereon. To this end and to secure properly finished tubes, provision is made for automatically interrupting the pulp web for a sufficient length of time so that the last end of the web may be coiled about the partly finished tube, the tube and its mandrel discharged from the forming point or station, and a new mandrel presented in time to receive the forward end of the on-coming web. In a machine such as illustrated and described in my said patent, the interruption or breaking of the pulp web occurs while the web is on the apron or felt which transfers it from the cylinder mold of the web-forming mechanism to the forming point or station of the machine.

The inventions or improvements which constitute the subject matter hereof relate more particularly to an improved process of and improved mechanism for breaking or interrupting the web, and more particularly before it is delivered to the carrier which finally conveys it to the forming mandrel. According to the preferred forms of the invention, the interruption of the web occurs when it is on the cylinder mold and is in a highly aqueous condition. To this end a portion of the web is removed from the cylinder mold and is preferably delivered outside of the vat in which the cylinder mold is located and which contains the aqueous pulp, so as to prevent any variation in the consistency of the aqueous pulp contained in the vat and being formed on the cylinder mold.

The operation of the breaking mechanism is automatically controlled in any suitable manner, as for example from the tube-forming point or station of the machine, in which case a tube of any given thickness of wall or number of windings may be formed before the web is interrupted or broken.

On the accompanying drawings,—

Figure 1 represents a side elevation of a tube-forming machine embodying the present invention and capable of practicing my new process.

Figure 2 illustrates more or less diagrammatically and conventionally those portions of the machine which include the breaking mechanism, and it illustrates the position of the parts when a finished tube has been removed from the forming station or point and a fresh mandrel is being supplied for the formation of a tube thereon.

Figure 3 is a similar view showing however the breaking mechanism in its operative position and with the other parts in their respective positions occupied by them just prior to the completion of a finished tube.

Figure 4 represents a side elevation of a portion of the machine and shows the breaking mechanism in its operative position.

Figure 5 is a fragmentary view of a part of the machine illustrated in Figure 4 but shows the breaking mechanism in its inactive position.

Figure 6 represents a longitudinal section through a portion of the machine wherein the pulp web is delivered to and wrapped about a mandrel located at the forming point or station of the machine.

Figure 7 is a detail view of the timing mechanism as it is seen looking from the left side of the machine.

Figure 8 is a view in reverse of the timing mechanism as shown in Figure 7, that is, looking from the right-hand side of the machine.

Figures 9 and 9ª represent views of a portion of the timing mechanism.

Figure 10 is a view of the same mechanism on a somewhat larger scale but showing the timing mechanism released.

Figure 11 is a side view partially in section of the mechanism shown in Figure 9.

Figure 12 (Sheet 3) illustrates a portion of the operating devices for the breaking mechanism.

Figures 13, 14, 15, 16, 17, 18 and 19 illustrate more or less conventionally various forms of web-breaking mechanism which may be utilized in connection with tube-forming machines, each figure illustrating means for removing the web from the cylinder mold of the machine.

Figure 20:
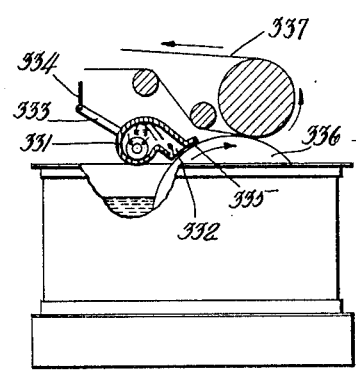
Figure 21:
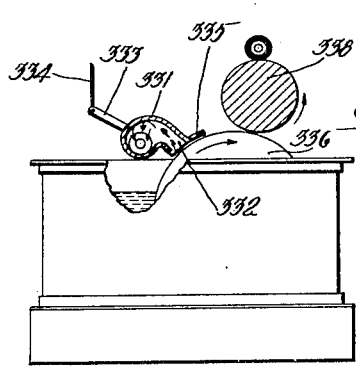
Figure 22:
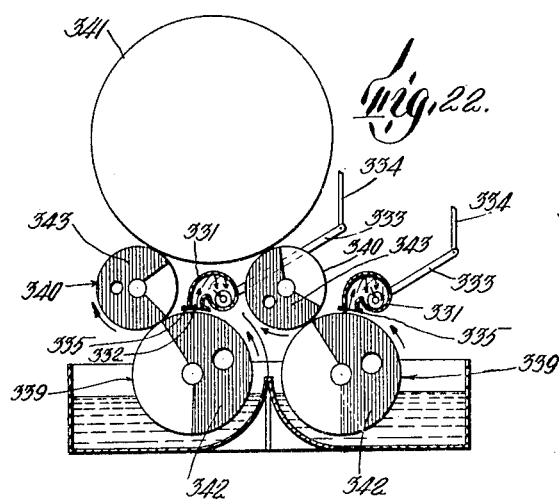

Figures 20, 21 and 22 illustrate conventionally web-interrupting or web-breaking mechanisms comprising suction devices for removing the web from the cylinder mold.

Figure 23:
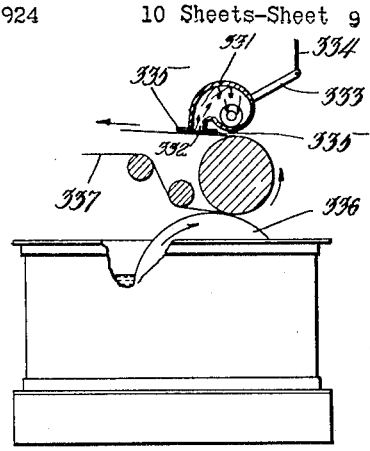
Figure 24:
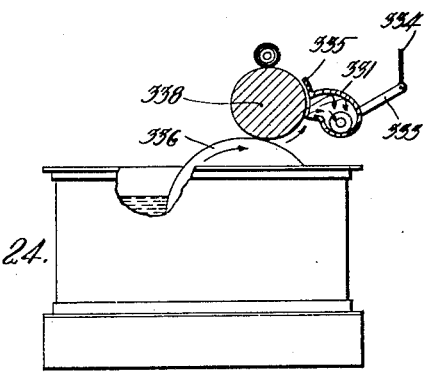
Figure 25:
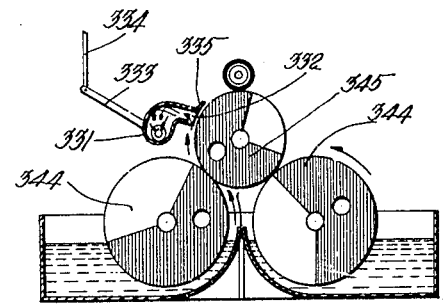

Figures 23, 24 and 25 illustrate web-breaking or interrupting suction devices for removing the web from transferring devices to which it is delivered from the cylinder mold.

Figures 26 to 31 illustrate various other forms of web-breaking or interrupting mechanisms which may be used with various web-forming mechanisms.

Referring to the drawings,—$a$ indicates a web-forming machine having a cylinder mold $a'$ upon which the pulp is formed into a web, such machine being of the type known as cylinder machines, and from which the web of pulp is transferred to any suitable conveying means such for example as an apron or making felt $b$ and carried thereby to the winding point or station of the tube-forming machine, whereat there are one or more base rolls (two being here shown) $c$ and $d$, on and between which the forming mandrels rest successively while the pulp is being wound thereon. In the illustrated embodiment of the invention shown in Figures 1 to 12, the apron $b$, which carried the web of pulp from the cylinder mold of the forming machine to the winding point, returns back about the base roll $d$, the pulp being picked from this apron or felt by the mandrel which is indicated at $e$. A second apron $f$, which is usually felt and is preferably drier than the apron $b$, passes about the base roll $c$ and carries away a certain excess of moisture which may be pressed from the pulp at this point during the winding operation. Pressure is brought to bear on the mandrel and the pulp thereon during the winding operation by the press roll $g$, and about this roll is passed another apron or felt $h$ which is relatively drier than the pulp at the point of contact and thus is adapted to carry away any moisture which is pressed out of the pulp during the winding operation. The directions of travel of the several felts $b$, $f$ and $h$ are indicated by arrows. These felts are preferably suitably driven so as to give rotary motion to the mandrel which occupies a position between the base rolls $c$ $d$ and the press roll $g$. As thus far described, it will be observed that a web of pulp, which is delivered to the making felt or apron $b$, is delivered to the mandrel $e$ and is wound upon the latter under pressure of the press roll $g$, and that excess moisture, which is pressed out of the pulp as it is wound about the rotating mandrel, is removed by the two felts $f$ and $h$. So long as a web of pulp is delivered to the making felt, it will be transferred thereby to the mandrel at the forming point or station of the tube-making machine; but mechanism is provided by which the web on the cylinder mold is removed therefrom so as to prevent its being delivered to the making felt so as thereby to interrupt the web which is delivered to the tube-forming mandrel. This mechanism, as will be subsequently explained more in detail, is operated automatically and may be controlled in any suitable manner, as for instance by the thickness of the tube being formed on the forming mandrel $e$. This mechanism is so operated that when the tube being formed is reaching its proper or ultimate thickness, the breaking mechanism interrupts or breaks the web so as to permit the make-up felt to transfer or carry to the forming mandrel only a sufficient length of web for the completion of the tube. As soon as the tube is completed, the press roll is automatically moved to an inactive position, the finished tube and its mandrel are removed from the forming station on the base rolls, and a new mandrel is introduced into the forming position. The operation of the breaking mechanism is of sufficient duration to permit these operations to occur before the web of pulp, which is again delivered to the making felt or apron $b$, reaches the second mandrel now at the forming station so as to be wrapped thereabout.

The tube-forming machine per se, is completely illustrated and described in my Patent No. 1,608,564 hereinbefore noted, to which reference may be made for an understanding of the details of construction thereof, and consequently only so much of the machine will be hereinafter described as is more or less related to the inventions and improvements which constitute the subject matter hereof. So far as is practicable, the parts and elements of the machine which is illustrated on the drawings correspond to those illustrated and described in my said patent have the same reference characters applied thereto as appear in said patent.

I have referred to the press roll $g$ as pressing upon the pulp tube as it is being formed upon the mandrel. It is of course necessary to raise this roll while a filled mandrel is being removed from the winding position and an empty mandrel is being positioned at the winding point. Hence the roll is mounted in bearings carried by slides 11, movable in guide plates 10 on the ends of the stub shafts 3 secured to the transverse members 2 of the side uprights 1 of the tube-forming machine. The slides 11 are connected to the straps 12 of the eccentrics 13, as follows:—each slide 11 is connected by a link 14 to the free end of a frame 15 pivoted to the main frame of the machine as at 16, and connected between its ends by a link 17 to and at a point between the ends of a floating lever 18, one end of which is connected to the arm of the eccentric strap 12. To the other end of the lever 18 there is connected a piston 19 working in a dash pot 20 carried by the frame 15 intermediate its pivot 16 and its point of connection with link 17. The floating lever 18 may be connected by a link 21 with a counterweight 22. It will be understood that the mechanism just described is duplicated, at the other side of the machine, only one being illustrated on the drawing. If the breaking or interrupting of the web is controlled by the thickness of the tube, the end of one of the floating levers 18 extends beyond the piston 19, as shown in Figure 6, and has secured thereto a cord 23, wrapped about the drum 24 of a rotatable disk 25 (hereinafter referred to as a thickness adjuster), and having a weight 26 on its dependent free end. Within the dash pot 20 there may be air, or oil or any other suitable liquid, and the piston may have small passages so that the air or liquid may flow from one side of the piston to the other. In operation, as the winding of the tube about the mandrel proceeds and the press roll rises,—due to the increasing thickness of the tube wall,—and, through the link 14, rocks the swinging frame 15 on its pivot 16, which through the link 17 forces up that end of the floating lever 18 to which the cord 23 is attached,—the other end of the floating lever at this time being held by and fulcrumed on the pivot which connects it to the eccentric strap 12. As the lever 18 is thus rocked upwardly, the cord 23 which is wrapped about the drum 24 gradually rotates the thickness adjuster 25. The thickness adjuster carries a cam projection 27, and, when a predetermined thickness of the tube wall has been secured, this cam projection reaches a point where it engages and operates a roll 28 fixedly journaled on a trip lever 29, as a result of which the timing mechanism hereinafter described is set in operation and certain other mechanisms of the machine are caused to function. The thickness adjuster is itself rotatively adjustable relatively to the drum, or the adjuster and the drum are adjustable relatively to the cord 23, so that the cam projection 27 may be set to operate the trip lever 29 when the tube wall has reached any desired thickness. The length of the cam projection is such as to prevent the roll 28 from riding off from it until the tube has been completed, irrespective of variations in thickness of the web under all normal conditions. The trip lever is secured upon and rocks a shaft 30 to which reference will be subsequently made, as controlling the timing mechanism.

The first operation, which occurs upon the operation of the trip lever 29, is the breaking or interruption of the web of pulp being delivered to the tube, which is caused by the operation of a shaft 48 provided with cams 47 which engage rollers on the lower ends of vertically movable bars. These bars are connected with power-transmitting devices for moving the web-breaking or interrupting mechanism into and out of active or inactive position, as will be hereinafter described.

The timing mechanism, which is set in operation by the tripping of the trip lever 29 by the trip finger 27 on the thickness adjuster 25, comprises the shaft 48 on which the cams 47 are mounted, a shaft 55 which carries the eccentrics 13 (hereinbefore referred to for moving the press roll $g$ upwardly when the winding of a tube is completed, and an intermediate shaft 87. 88 is a driving shaft, driven from a suitable source of power, by which, through suitable gears, are driven gears 90, 91 and 92 loosely mounted respectively on shafts 48, 87 and 55. Fast on these shafts are clutch drums 93, 94 and 95, each closely associated with its cooperating gear 90, 91 or 92, as the case may be. Each clutch drum is equipped with a radially-movable spring-pressed pawl 96 (see Figures 9 and 11) having a portion which is adapted to engage in notches 97 in the associated gear and a projection 98 which cooperates with a cam such as at 99, to retract the pawl or force it back into its pocket in the clutch drum and disengage it from the gear. It will be understood that on each of the shafts 48, 87 and 55 there is a like clutch associated with the gear on that shaft and that there is a cam for disengaging the clutch drum pawl from such gear.

Referring to Figures 7 and 9ª, the parts of the timing mechanism are shown thereby as being in the positions which they occupy while they are inactive and a tube is being formed on the mandrel. The cam 99 is engaged with the clutch pawl 96, and is holding the latter in its retracted position, so that consequently the clutch drum and the shaft are unclutched from the constantly rotating gear 90, and are held against movement. The free end of the cam 99 at this time is held up by the pivotally mounted latch 100 which is weighted at one end, and which at its other end has a dog 105 resting on a spring latch 1002 carried on the end of a finger 104 extending from the shaft 30, which as previously explained is rocked by the thickness measurer when the tube being wound is approaching its desired wall thickness. When the tube wall has been built to a predetermined thickness, the shaft 30 is rocked so as to lift the dog 105 (from the position shown in Figure 9ª) into the path of and into engagement with a tooth of the gear 90 (as shown in Figure 9), whereupon the tooth thrusts the pawl endwise and rocks the latch 100 to the left and into the position shown in Figure 10 so that the cam 99 is free to drop by gravity and release the pawl 96, which in turn connects the clutch 93 and the shaft 48 with the rotating gear 90. The rotation of the shaft 48 effects the raising of the bars 45 (due to the weight of the breaking mechanism which holds the rolls of said bars against the cams) and thereby causes the web-breaking or interrupting mechanism to be moved or dropped into active position so as to interrupt the continuity of the web then being delivered for the winding of the tube on the mandrel. The interrupting or breaking mechanism remains in its active position, during one complete rotation of shaft 48, only so long as the rolls of the bars 45 are in engagement with the low or neutral portions of cams 47. The cams 47 are rotatively adjustable about the shaft 48 and may be fixed thereto after adjustment, so that the time of operating the breaking mechanism may be varied within any reasonable limits.

The timing mechanism causes certain other operations to be performed, namely the raising of the press roll, the operation of certain carrier wheels to remove the mandrel having the finished tube from its position on the base rolls and to place an empty mandrel in forming position and to lock the carrier wheels in position, as will be subsequently briefly described. When the gear 90 and the clutch drum 93 have almost completed one revolution, a projection 106 on the face of the clutch drum engages the cam 107 which is pivoted at 108, and the displacement of this cam releases the pawl 110 of the clutch drum 94 which springs forward and engages the gear 91 thereby driving the shaft 87 and the arm 111 carried thereby. The arm 111 is rotatively adjustable about its shaft 87 to advance or retard the timing operation. Just before the gear 91 and its clutch drum 94 have completed one revolution, the arm 111 rides under the end of the lever 112 which is pivoted at 113 and is connected by the link 114 with the cam 115 pivoted at 116 (see Figure 8). This motion throws the cam 115 out of position and releases the pawl 117 so that it springs outward and connects with the gear 92, thus causing the rotation of the shaft 55 and the operation of the eccentrics 13. Thereupon the eccentrics, through the operation of the floating levers 18, the link 17, the pivoted frame 15 and the links 14, raise the slides 11 and move the press roll $g$ upwardly out of engagement with the finished tube on the mandrel then at the forming station on the base rolls, and hold it elevated until the mandrel has been discharged and has been replaced by an empty mandrel. It may be remarked at this point that the frame carries two rolls $m$ and $n$ over which the top felt $h$ passes, so that the felt is not loosened when the press roll is raised. The interruption in the pulp web must take place sufficiently in advance of the lifting of the press roll to permit the tail end of the web to be wrapped about the almost-completed tube before the roll is lifted. As soon as the cams 107 and 115 are moved to release the pawls 110 and 117 so that they may engage their associated gears and the pawls have moved on, these cams are returned by springs 118 and 119 to their normal positions. Just before the gear 90 and its connected clutch drum have completed their rotation, the projection 98 of pawl 96 strikes a plate 122 connected to a segmental gear 123 which meshes with another segmental gear 124 pivoted at 125 and having a pin 126 which engages the under side of cam 99, thereby raising the cam 99 until the weighted latch 100 engages the end thereof as shown in Figure 9$^a$, the dog 105 slipping over the finger 1002, which yields, as the latch 100 swings about its pivot, until the dog 105 rests on the end of the finger 1002 and is thus again in position to be lifted into the path of a tooth of the gear 90. The clutch drum 93 and the shaft 48 come to a state of rest when the pawl 96 engages the shoulder on the cam 99 with the breaker mechanism in an inactive position. As the gear 91 and its associated drum 94 complete their revolution, the cam 107 disengages the pawl 110 from the gear and stops the rotation of the clutch drum and the shaft 87. The shaft 55 and its associated clutch drum complete one revolution and are then stopped by the engagement of the pawl 117 with the cam 115, which after releasing the pawl had been restored to initial position by spring 119. This now brings all the parts to rest, at which time a new mandrel has been positioned between the base rolls and the press roll and the winding of a new tube starts. From the explanation thus far given, it will be observed that the web-breaking or interrupting mechanism is set in operation before the press roll is raised, and ceases to function before the press roll is restored to active position, the correlation or coordination being such that the continuity of the web is interrupted only so long as may be necessary to permit the removal of the filled mandrel and the supply of an empty mandrel; but, since the interrupting mechanism removes the web from the cylinder mold which is at some distance from the forming mandrel, a sufficient time must elapse after the web has been interrupted to permit the tail end thereof to be wrapped about the almost-completed tube before the press roll $g$ is lifted from the tube, this being all attained by the timing mechanism described. It will also be seen that the operation of the breaking mechanism is automatic, and that with the mechanism as illustrated it is controlled by the thickness of the tube itself, through the intermediacy of the press roll and the thickness measurer 25, which sets the timing mechanism in operation.

The web-interrupting or breaking mechanism interrupts the continuity of the web being delivered by conveying means to the forming mandrel. This may be accomplished either by removing the web from the cylinder mold before it reaches the conveying means during the normal rotation of the cylinder mold, as previously stated, or by removing it at some other point before it reaches the mandrel. The present invention is not limited to any particular form of device for accomplishing this, as various contrivances may be used for the purpose, and I have shown several of many of such devices as may be suitable. In Figures 1 to 12, for example, I have illustrated a mechanism which is applicable for use in the particular form of machine shown in these figures, in which the conveying means for the pulp web is in the form of a felt or apron. In this case it will be noted that the making felt $b$ passes about a couch roll $i$ which rests upon the cylinder mold $a'$, being guided thereto under a roll $j$ and over another roll $k$ so that the making felt is engaged with the periphery of the cylinder mold $a'$ sufficiently to receive the web of pulp which is carried thereto by the up-going side of the cylinder mold. This cylinder mold rotates in the direction of the arrow, or clockwise in reference to one standing on the right-hand side of the machine. Adjacent the up-going side of the cylinder mold there is located a breaking or interrupting felt $l$ which is continuously driven by any suitable source of power and which passes around one or more (in the present instance two) breaking or interrupting rolls $t$ and $u$. This felt is guided by a plurality of rolls, of which there may be as many as desired including a take-up roll $o$ and squeeze rolls $p$ $p$, one or both of which may be driven by any suitable source of power. The two rolls $t$ and $u$ are journaled in a frame which comprises the side bars 200 (see Figures 4 and 5), provided with appropriate bearings therefor, and these frames are connected with links 201 to a cross-bar or support 202 which is adapted to be raised and lowered by power-transmitting connections extending therefrom to the upright bars 45 which it will be remembered are operated by the cams 47. At the outer ends of the cross bar 202 are secured guideways or guide boxes 203 to receive the upright sectional rods 204. Each of these rods is preferably made in two sections, the adjacent ends of which are oppositely threaded into a nut 205 which may be rotated to extend or contract the rod as a whole. The lower end of the lower section of each of these rods is provided with rack teeth for engagement with a pinion on a cross shaft 206 journaled in the guide boxes 203. By means of a hand wheel 207 on the projecting end of the shaft the pinions may be rotated so as to adjust the bar 202 upwardly or downwardly as the case may be so as to raise and lower the frame in which the interrupting or breaking rolls $t$ and $u$ are journaled to permit the replacing of a new felt. Pawls 208 on the guide boxes are adapted to engage the rack teeth on the rods 204 to lock the rods and the crossbar together after they have been relatively adjusted. The upper ends of the two rods 204 are pivoted to bell-crank levers 209 mounted upon a shaft 210 journaled in brackets 211 upon a stationary super-structure, fragments of which are indicated at 212. These bell-crank levers 209 are connected by sectional horizontal connecting rods 213 with bell-crank levers 214 mounted on a shaft 215 journaled in brackets on the superstructure 212. One arm of each of the bell cranks 214 is connected to one of the upright rods 45. The two sections of each of the connecting rods 213 are oppositely threaded into an adjusting nut 216 by which they may be extended or retracted. The frame 200 and the rolls $t$ and $u$ are relatively heavy and would exert a constant and heavy pressure against the breaking cams 47, so that I provide means for partially and yieldingly counterbalancing the weight of the frame and rolls. To this end I secure to the super-structure 212 rotatable rods 217, the lower ends of which are threaded into hangers 218. By rotating each rod 217 as by means of a hand wheel 219, the associated hanger 218 may be vertically adjusted. Each hanger 218 has hooks from which are suspended one or more springs 220, the lower ends of which are engaged with hooks 221 on the upper end of a chain 222. The crossbar 202 at its ends is secured to these chains 222. In this way the frame 200 and the rolls $t$ and $u$ are yieldingly sustained by the springs 220, the strength of which, however, is insufficient entirely to support the frame and rolls, but making it possible, however, for the breaker cams 47 through the power-transmitting connections or series of connecting rods and bell-crank levers to raise and lower the frame and rolls to cause the interrupter or breaking felt to engage or disengage the cylinder mold as the case may be.

The frame comprising the side bars 200 is guided in its movement by guideways 223, 224, affixed in any suitable manner to the sides of the vat in which the cylinder mold rotates. Each end of the frame is provided with slides 225, 226 movable in the two guideways 223, 224 respectively. These guideways are arranged at such an angle to each other and to the cylinder mold that, when the frame is at one end of its movement as for example at the upper end of its movement, the interrupter felt $l$ is out of engagement with the cylinder mold, as shown in Figure 5, and, when the frame is lowered, the felt $l$ and the roll $t$ are engaged with the cylinder mold so as to remove the web of pulp on the up-going side of the cylinder mold after the web has been formed but before it is delivered to the making felt or conveying means $b$. Of course it will be understood that the speed of travel of the felt $l$ is the same as the peripheral speed of the cylinder mold. It is desirable during the movement of the breaker rolls $t$ $u$ that the tension of the felt $l$ should not be changed. Consequently the guide rolls $r$ and $s$ for the felt $l$ are so placed in reference to the guideways 223, 224 that the movement of the frame effects no material variation in the tension of the felt $l$. When in the cycle of operation of the timing mechanism the frame 200 is dropped so as to bring the breaker felt into engagement with the cylinder mold $a'$, the downward movement of the felt as it engages the cylinder mold makes a clean break of the web which is being carried by the cylinder mold to the making felt $b$, and the felt $l$ thereafter transfers the web from the cylinder mold so long as the felt $l$ is in contact therewith. The pulp web is therefore carried by the breaking felt away from the cylinder mold and the vat, and this web is removed from the felt by a couch roll $p$, from which it is scraped by a doctor 227 to a receptacle 228 from which it may be transferred to a storage tank or to the beaters by which the stock is prepared. When, however, the frame 200 is again raised so as to disengage the breaker felt from the cylinder mold and to permit the felt web to be taken up once more by the making felt $b$, the bodily upward movement of a portion of the felt $l$ in the direction of movement of the adjacent surface of the cylinder mold, together with its speed of travel, makes another clean break in the web upon the cylinder mold so that the advancing end of the fresh pulp web as delivered to the making felt $b$ is substantially clean, so that it may, when it reaches the empty forming mandrel, be properly taken up thereby and wound thereon.

It will be understood that (although I have not shown them since they are well known in the art) any suitable whipping, washing and suction apparatuses or devices are utilized for cleaning and drying the breaker felt $l$, as well as the making apron $b$. For the felts $h$ and $b$, I have conventionally indicated wringers at $x$ and $y$.

In forming homogeneous fiber tubes from aqueous pulp, it is desirable of course that the pulp or stock suspension in the vat of the web-forming machine should be highly dilute to permit the proper formation of the web on the cylinder mold. For example, I find it desirable to use in the vat aqueous pulp having a stock concentration of about .25%. When the web is initially formed on the cylinder mold and is carried above the surface of the pulp in the vat so that a portion of the water has leached therefrom, the stock suspension may be from 2% to 3%; whereas, after the stock has been transferred to the make-up felt and is passed under the couch roll $i$, the stock concentration may be, say, from 18% to 20%; whereas, at the time the web reaches the mandrel, it may possess a stock concentration of, say, 25% to 35% varying, of course, with the thickness of the web. By increasing the pressure of the couch roll, the stock concentration on the apron $b$ may be materially increased, so that the stock concentration may be likewise increased at the point of its transfer to the mandrel, all other things being equal. When, however, the stock concentration on the apron or make-up felt $b$ is relatively high, it becomes increasingly difficult to interrupt or break the web on the make-up felt, whereas it is possible, by interrupting or breaking the web while it is on the cylinder mold where the stock concentration is low, to accomplish this with ease even though the web may be very thick on the cylinder mold. The thicker the web on the cylinder mold and the making felt the more quickly can the tubes be formed and a greater homogeneity secured in the wall of each tube; but, no matter how thick the web may be on the cylinder mold, it is easily and cleanly severed by reason of its low stock concentration. The stock is supplied to the vat continuously by the usual means ordinarily provided for this purpose; so that, in order to prevent a variation of the stock in the vat, it is desirable that the stock, which is removed from the cylinder roll during the interruption in the continuity of the tube-forming web, should be removed from the vat. This is accomplished by means of the felt $l$ and the doctor located outside of the vat which removes the web from the felt. If desired a trough 230 may be located between the rolls $t$ and $u$ opposite the engagement of the felt $l$ and the cylinder mold, as indicated conventionally in Figure 2, to receive the water which is expressed from the web through the felt $l$ and discharge it beyond the end of the cylinder mold and beyond the outside edges of the felt.

In Figure 2, it will be noted that the filled mandrel has been moved from its position on the base rolls $c$ and $d$, that the press roll $g$ has been raised, that an empty mandrel as at $x$ is being carried to position on the base roll, and that the making felt *b* is carrying the forward end of the web indicated at *z* toward the forming point of the machine. At this time the cams 47 are stationary and the high portions thereof are holding the breaker rolls and the breaker felt *l* out of engagement with the cylinder mold *a'*. In Figure 3 the parts are in the position which they occupy after the timing mechanism has started its operation and the tube is nearly completed on the forming mandrel, the cams 47 have completed a part of their rotation and the breaker rolls *t* and *u* and the breaker felt have been moved into active position, so that the felt *l* has interrupted the web on the make-up felt *b* and is transferring a web from the cylinder mold to the doctor 227 which is removing the web from the felt *l*. As soon as the last end of the web on the making felt *b* has been wrapped about the almost-completed tube, the press roll *g* is lifted as previously described and other parts are operated from the timing mechanism to cause the removal of the filled mandrel from the base rolls and the supply of a fresh mandrel.

Although specifically the parts now to be described do not per se constitute a portion of the present invention inasmuch as they are set forth and claimed in my said patent hereinbefore referred to, nevertheless a brief description may be given in order that one may understand the coordination of the several parts of the tube-forming machine in their relation to the operation of the web-interrupting or breaking mechanism. These parts now to be briefly described are those which cause the supply of mandrels successively to the base rolls so that tubes may be wound thereon and the removal of the filled mandrels from the forming point of the machine.

At the rear of the forming point in the machine there is a mandrel-feeding table 231 upon which many mandrels are positioned and held by a stop to be described, and forwardly of the winding position of the machine is a mandrel-receiving table 232 on to which the filled mandrels are delivered from the winding point, this receiving table being preferably in the form of tracks to support the ends of the mandrels which project beyond the tubes which have been formed thereon. On the stub shafts 3 hereinbefore referred to are the carrier wheels 5 each having secured thereto a plurality of pivoted arms 6, in the free end of which are chuck bars 7, carrying chucks at their inner ends. A chuck on one of the carrier wheels is in alinement with a chuck on the other carrier wheels so that these two chucks are adapted to engage the ends of a mandrel and support it between them so that the mandrel is free to turn on the chucks and has sufficient play to permit it to move as the wall of the tube increases in thickness. The shaft 55, which supplies power for raising and lowering the press roll *g* through the eccentrics 13 and the intermediate devices, is supplied with an arm 56 having a link 57 connected to its free end, and connected to the lower end of the link there is a dog 58. The link and the dog are guided in their movements by an arm 63 journaled on the stub shaft 3. When the dog is carried to its lowest position, it is forced by a spring 59 to engage one of the pins 60 by which the arms 6 are pivoted to the carrier wheel. When the link 57 is raised, the dog 58 moves the carrier wheel one step, and it will be understood that there is a similar mechanism at each side of the machine so that each of the carrier wheels is engaged by similar dogs 58 and operated simultaneously. After the carrier wheels have completed one step, the dogs 58 are disengaged from the pins by positioning fingers 64 fixed to a shaft 65 which is turned through the action of the link 66 operated by a roller 67 in the cam groove 68. The upper end of the link is guided by a lever 671 pivoted to the frame. When these fingers 64 are operated, they knock off the dogs 58 and stand between two of the pins 60 to hold the carrier wheels in the new position. The front mandrel on the feeding table 231 rests against stops 69 (see Figure 6), at which time said mandrel has been engaged with a pair of chucks on the carrier wheel; and, when the slide 12 is raised to lift the press roll *g*, this stop 69 which is connected with the slide is raised so that the forward mandrel may be fed forwardly into winding position and at the same time a pivoted stop 70 on a lever 71 pivoted to the guideway 10 is moved downwardly so as to engage the next mandrel on the table 231. When the foremost mandrel on the table has been fed to the forming position and the press roll *g* is moved downwardly, the stop 70 is raised and the stop 69 is lowered to the positions occupied by them in Figure 6. A suitable mechanism, which is set forth in detail in my said Patent No. 1,608,564, but which may not be described here, is utilized for moving the chucks lengthwise into and out of engagement with the mandrels at appropriate times.

I have stated that the continuity of the pulp web to the forming mandrel may be interrupted by various forms of breaking or interrupting mechanism, and in Figures 13 to 19 inclusive I have shown more or less conventionally and diagrammatically several of these mechanisms by which the web on the cylinder may be removed to interrupt the supply of web to a mandrel, without intending to indicate however that these are the only ones which may embody the invention as set forth in the claims. In Figure 13 I have illustrated the forming mechanism as comprising a vat 300, the cylinder mold 301, and the making felt 302 which is passed around the couch roll 303. In this case the mechanism for removing the web from the cylinder mold comprises a suction roll 304 which is moved into and out of engagement with the cylinder mold by any suitable means at the proper time. The web is removed from the roll 304 by a doctor to a receptacle 305 from which it is removed by a screw conveyor indicated conventionally at 306. In Figure 14, the web is removed by a couch roll 307 which is moved into and out of engagement with the pulp web on the cylinder mold and from which the pulp is removed by a doctor and trough indicated conventionally at 308. In Figure 15 a couch roll 309 removes the web from the cylinder mold and transfers it directly to the mandrel 310 which is located directly thereabove. In a forming and tube-making machine of this character, the continuity of the web delivered by the cylinder mold to the couch roll 309 may be broken by a breaker felt 311, the breaker roll 312 about which it passes being moved into and out of engagement with the cylinder mold. In Figure 16 the make-up felt 313 passes from the couch roll 314 around a base roll 315 upon which the forming mandrel 316 rests. In a machine of this character one may use a breaking felt 317 which may be moved into engagement with the cylinder mold and the pulp web thereon by a breaker roll 318, and the web from this felt may be removed by any customary manner, such as squeeze rolls, with one of which a doctor is employed. It is obvious that in the machine illustrated in Figures 1 to 12 inclusive, it is not necessary that both of the rolls which are mounted upon the frame should be bodily moved. In Figure 17, for example, a roll 320, which corresponds to that at $t$ in Figure 3, may be movable and the roll 321 which corresponds to that at $u$ may remain stationary. In such case the roll 320 may be moved in lines substantially radial to the cylinder mold. In this case a trough 322 may be located in proper relation to the breaker felt 323 to receive the water which is pressed from the pulp by the engagement of the roll 320 and the felt with the web of pulp. Instead of employing a trough and doctor for this purpose, I may employ a suitable suction apparatus, indicated conventionally at 324 in Figure 18, for removing the excess water.

In some cases it may be desirable to utilize the pulp web which is removed by the breaker felt for the formation of a tube, so that the web may be carried by one making felt to one mandrel, and, when that web is interrupted, the breaker felt may carry the web from the cylinder mold to another mandrel for the formation of a separate tube thereon. Such an arrangement is indicated conventionally in Figure 19. In this case there is a make-up felt indicated at 325 which transfers a web of pulp to a mandrel in the same manner in which this is accomplished by the mechanism indicated conventionally in Figure 3, except that of course the web carried by this make-up felt 325 is interrupted long enough so that the felt 326 which serves as a breaker may carry sufficient pulp for the formation of another tube on a mandrel indicated at 327. In an arrangement of this kind, when the tube, which is being formed from the web supplied by the make-up felt 325 is nearly completed, the breaker rolls 328, 329 are lowered automatically into position so that the felt 326 removes the web from the cylinder mold 330 and transfers it to the mandrel 327. The parts should then remain in this position until sufficient pulp has been delivered to the mandrel 327 to form a tube of the desired thickness thereon. When this has been accomplished, the breaker rolls 328, 329 are moved to an inactive position, whereupon the web is now delivered from the cylinder mold to the make-up felt 325.

In all of these various embodiments of the invention, it will be observed that the pulp, which is removed from the cylinder mold upon the breaking of the web that is being delivered for the formation of a tube, is carried away from the vat and is not permitted to drop back into the vat to be commingled with the stock therein.

In Figures 20 to 25 inclusive, I have shown various types of web-forming machines in which a suction or vacuum device is employed for interrupting a pulp web which is normally delivered to a winding mechanism or other form of web-manipulating mechanism. In each case, I may employ a casing 331 having an open throat 332 of a length not less than the width of the web which is movable toward and from the web by any suitable controlling mechanism. As shown, the casing is journaled on trunnions of which one may be hollow and connected to a vacuum pump (not shown). To one of the trunnions may be connected an arm 333 from which a connection 334 extends to any suitable timing mechanism. By rocking the casing on the axis of its trunnions, the throat, which is normally spaced from the pulp web, may be brought into contact therewith so that the pulp web will be sucked into the casing and delivered to a separator and storage tank. The longitudinal walls forming the throat are preferably formed with one or more lips 335 or flanges appropriate to the character of the web carrier. In some instances, such as illustrated in Figures 20 and 21, the web-interrupting device may remove the web from the upgoing side of the usual cylinder mold 336 to interrupt the delivery thereof to the conveyor, such as the felt 337, or the couch roll 338. If desired, however, the web may be picked from the conveyors, i. e., the apron or felt 337, as in Figure 23, or from the couch roll 338, as in Figure 24.

In Figure 22, I have shown a multi-cylinder web-forming machine, in which the cylinder molds 339 deliver pulp webs to couch rolls, and thence either to a conveyor or a large mandrel as indicated conventionally at 341. In this case, the web on the cylinder molds is subjected to suction in pasing through the arc indicated at 342, and the suction couch rolls are such that the web thereon is subjected to the action of a partial vacuum in passing over the arc indicated at 343. In Figure 25, the web from the sectional suction cylinder molds 344 is picked up by a single sectional couch roll 345 and thence delivered to the mandrel. The suction, web-interrupting or web-breaking devices may remove the web, either from the cylinder molds, as in Figure 22, or from the suction couch roll as in Figure 25.

Instead of sucking, or by partial vacuum, removing the pulp web from the cylinder mold or the conveyor, it may be blown therefrom or removed by other methods. For example, in the multi-cylinder machine shown in Figure 26, there are shown within the hollow cylinder molds 346, from which the web is normally removed by the sectional suction couch rolls or conveyors 347, and there may be placed manifolds 348 into which air or water may be delivered under high pressure and delivered through a long narrow throat 349 against the interior faces of the screens of the mold at the up-going sides of the molds, so as to blow or force the pulp web from the outer face thereof into properly arranged troughs 350, 350. Such troughs may be provided with screw conveyors indicated conventionally at 351 for delivering the pulp to a suitable storage tank. In such case, the admission of air or water to the manifolds may be automatically controlled by suitable timing mechanism. In Figure 27, the manifold or blowing device 352 is arranged within a couch roll and conveyor 353 common to the two sectional suction cylinder molds 354. Either the cylinder mold or the couch roll or conveyor may be movable about internal stationary chambers, in certain of which a partial vacuum is maintained, and in others of which there may be a controlled high pressure, so that at certain intervals air may be delivered at sufficient pressure thereto so as to blow the pulp from the mold or roll. In Figure 28 for example, the shell of the mold moves about a chamber 355 (the shell forming the outer wall thereof). This chamber is so located in respect of the up-moving side of the cylinder mold, that, when air is admitted thereto through port 356, the pulp is blown into the covered trough 357. In Figures 29 and 30, the couch roll 358 encloses several chambers, 359, 360, 361, those at 359, 361, being suction chambers, and that at 360 a pressure chamber. When air or water is delivered under pressure to the chamber 360, the pulp is blown into a trough 362 from which it may be removed by a screw conveyor 363.

The pulp, however, may be loosened and removed by a combined brush as shown in Figure 31. A trough 364 having a driven rotary brush 365, may be moved into and out of position to cause the brush to remove the pulp from the cylinder mold or to permit the pulp web to pass to a couch roll or conveyor. A hood 366 may be placed over the brush and the doctor 367, and the trough may be provided with a screw or other form of conveyor for removing the pulp therefrom to a storage receptacle.

In the explanation which I have given of these inventions and improvements, it will be understood that the phraseology which I have employed is for the purpose of description and not of limitation, that I have not attempted to illustrate the various parts in their exact relative sizes, and that the various felts are cleaned and dried and are properly guided by the various mechanisms which are ordinarily employed for these purposes.

It will be understood by those familiar with the art of paper making and similar industries, that during the rotation of the cylinder mold, which is partially submerged in the aqueous pulp, the thickness of the web on any longitudinal zone increases from the time such zone dips into the aqueous pulp until it emerges from the level of the aqueous pulp, and that the stock concentration of the pulp web on the longitudinal zone of the cylinder mold, which at the moment lies between the pulp level in the vat and the making felt or couch roll, is very low, so that it may be reiterated by removing the web from this zone of the cylinder mold, as in my preferred embodiments of the invention, the cylinder mold may be stripped clean and the web interrupted and removed with great ease.

What I claim is:—

1. In a machine for making fiber tubular bodies, a tube-forming mandrel, a cylinder mold, a conveyer for receiving the pulp web from the mold for delivery to the mandrel, and means for interrupting the pulp web prior to its delivery to said conveyer.

2. In a machine for making fiber tubular bodies, a tube-forming mandrel, a cylinder mold, a conveyer for receiving the pulp web from the mold for delivery to the mandrel, and means for interrupting the pulp web by removing it from the cylinder mold.

3. In a machine for making fiber tubular bodies, a tube-forming mandrel, a cylinder mold, a conveyer for receiving the pulp web from the mold for delivery to the mandrel, and a web breaker or interrupter movable into and out of engagement with the cylinder mold.

4. In a machine for making fiber tubular bodies, a cylinder mold for forming and a conveyer for receiving therefrom a web of pulp of such low stock concentration as to be incapable of sustaining its own weight, in combination with a web breaker arranged to break the web before its delivery to said conveyer.

5. In a machine for making fiber tubular bodies, a web-forming means for forming a pulp web of such low stock concentration as to be incapable of sustaining its own weight, means for receiving the web directly from the forming means, and means for breaking and interrupting the web before the delivery of the web from said forming means to said receiving means.

6. In a machine for making fiber tubular bodies, a web-forming means, means for receiving the web, a breaker for breaking or interrupting the web before delivery thereof from said web-forming means, and mechanism for periodically operating said breaker.

7. In a machine for making fiber tubular bodies, a web-forming means, means for receiving the web, and means for periodically removing the web from the forming means and thereby interrupting its delivery to said receiving means.

8. In a machine of the character described, a web-manipulating mechanism, a web-forming mechanism adapted to supply web for the web-manipulating mechanism, and means controlled by the supply of web to said web-manipulating mechanism for removing the web formed on said web-forming mechanism to interrupt the supply of web to said web-manipulating mechanism.

9. In a machine of the character described, a web-manipulating mechanism, a web-forming cylinder mold, and means controlled by the supply of web to said web-manipulating mechanism for removing the web from said cylinder mold and thus to interrupt the supply of web to said web-manipulating mechanism.

10. In a machine of the character described, a tube-forming mandrel, a web-forming cylinder mold for supplying web for the formation of a tube on said mandrel, and a breaker for periodically removing the web from the cylinder mold to interrupt the supply of web to said mandrel.

11. In a machine of the character described, a tube-forming mandrel, a web-forming cylinder mold for supplying web for the formation of a tube on said mandrel, and a breaker controlled by the thickness of the tube on said mandrel for periodically removing the web from the cylinder mold and thus to interrupt the supply of web to said mandrel.

12. In a machine of the character described, a tube-forming mandrel, a cylinder mold, a conveyer for transferring web from the cylinder mold to the mandrel, and a web breaker movable into engagement with the web on the cylinder mold to interrupt the supply of web to said conveyer.

13. In a machine of the character described, a tube-forming mandrel, a cylinder mold, a conveyer for transferring web from the cylinder mold to the mandrel, a web breaker movable into engagement with the web on the cylinder mold to interrupt the supply of web to said conveyer, and means controlled by the thickness of the tube on the mandrel for periodically operating said breaker.

14. In a machine of the character described, a tube-forming mandrel, a cylinder mold, a conveyer for transferring web from the cylinder mold to the mandrel, a web breaker having an endless surface movable into engagement with the web on the cylinder mold, and means for actuating said breaker to cause its surface to move at substantially the same rate as the peripheral speed of the cylinder mold.

15. In a machine of the character described, a rotary cylinder mold, a pulp vat in which the cylinder mold operates, a member for removing from the cylinder mold the pulp web formed thereon, and means for periodically engaging said member with and disengaging it from the pulp web on said cylinder mold.

16. In a machine of the character described, a rotary cylinder mold, a pulp vat in which the cylinder mold operates, a member for removing from the cylinder mold the pulp web formed thereon and having a moving surface for engagement with said pulp web, and means for periodically moving said member into and out of surface engagement with said web.

17. In a machine of the character described, a web-forming mechanism comprising a pulp vat and a web-forming member operating in said vat, a web-manipulating mechanism for which the web is supplied by said member, and a web breaker for periodically removing web from said member and delivering it outside said vat.

18. In a machine of the character described, a web-forming mechanism for forming a web of pulp characterized by a low stock concentration, mechanism for increasing the stock concentration of said web and for delivering it in relatively concentrated form for manipulation, and means for interrupting the supply of said web by said web-forming mechanism at a point where said web is characterized by said low stock concentration.

19. In a machine of the character described, a pulp vat, a rotary cylinder mold partially submerged in the aqueous pulp, a conveyer for receiving the pulp web from the cylinder mold and arranged above the cylinder mold, and a web breaker periodically operating to remove the pulp web from the cylinder mold at that portion of the cylinder mold which is between the aqueous pulp in the vat and the said conveyer.

20. In a machine of the character described, a cylinder mold, a conveyer for normally receiving the pulp web from the cylinder mold, and a travelling conveyer periodically removing pulp web from the cylinder mold before said web reaches the first-mentioned conveyer.

21. In a machine of the character described, a cylinder mold, a making felt normally receiving the pulp web from the cylinder mold, and a breaker felt periodically movable into contact with the web on said cylinder mold to interrupt the supply of web to said making felt.

22. In a machine of the character described, a cylinder mold, a making felt normally receiving the pulp web from the cylinder mold, an endless breaker felt travelling in proximity to the periphery of said cylinder mold and the pulp web formed thereon, and mechanism for periodically moving said breaker felt into engagement with said pulp web on said cylinder mold to remove it therefrom and thereby interrupt the supply of pulp to the making felt.

23. In a machine of the character described, a web-manipulating mechanism, a cylinder mold which normally supplies a pulp web to said mechanism, an endless breaker felt travelling in proximity to the periphery of said cylinder mold, and mechanism automatically controlled by the supply of web to said web-manipulating mechanism for moving said breaker felt into engagement with the web on said cylinder mold to interrupt the supply of web to said web-manipulating mechanism.

24. In a machine of the character described, a cylinder mold, a conveyer for normally receiving the pulp web from the cylinder, a travelling conveyer periodically removing pulp web from the cylinder mold before said web reaches the first-mentioned conveyer, and means for removing the pulp web from said travelling conveyer.

25. In a machine of the character described, a cylinder mold, a making felt normally receiving the pulp web from the cylinder mold, a breaker felt periodically movable into contact with the web on said cylinder mold to interrupt the supply of web to said making felt, and means for removing the pulp from said breaker felt.

26. In a machine of the character described, a cylinder mold, a making felt normally receiving the pulp web from the cylinder mold, an endless breaker felt travelling in proximity to the periphery of said cylinder mold and the pulp web formed thereon, mechanism for periodically moving said breaker felt into engagement with said pulp web on said cylinder to remove it therefrom and thereby interrupt the supply of felt to the making felt, and means for removing the pulp from said breaker felt.

27. In a machine of the character described, a pulp vat, a cylinder mold partially submerged in the aqueous pulp therein, web-manipulating mechanism for which the pulp web is supplied by said cylinder mold, a breaker felt for removing web from the mold in advance of its delivery therefrom for said web-manipulating mechanism, and means located outside of the vat for removing the pulp from said breaker felt.

28. In a machine of the character described, a cylinder mold, a web-receiving member normally receiving the web from the cylinder mold, a breaker for periodically removing web from the cylinder mold before the web is delivered by said mold to said receiving member, means for guiding said breaker toward and from said cylinder mold, and mechanism for moving said breaker in said guiding means.

29. In a machine of the character described, a cylinder mold, a web-receiving member normally receiving the web from the cylinder mold, a breaker felt for removing web from the cylinder mold and thus to interrupt the supply of web to said web-receiving member, one or more rolls located in proximity to the up-moving periphery of the cylinder mold and by which said breaker felt is guided, and means for moving said roll or rolls bodily toward and from said cylinder mold to cause said breaker felt to engage the web on said cylinder mold.

30. In a machine of the character described, a cylinder mold, a web-manipulating mechanism for which web is normally supplied by said cylinder mold, a web breaker movable to active and inactive positions, mechanism controlled by the supply of web at the web-manipulating mechanism including a linkage of pivotally connected members extending from said breaker, and springs mounted over said breaker, said springs taking a portion of the weight of the breaker from said linkage.

31. In a machine of the character described, a cylinder mold, a web-manipulating mechanism for which web is normally supplied by said cylinder mold, a web breaker movable to active and inactive positions, cams controlled in operation by the supply of web to the web-manipulating mechanism, power-transmitting means bearing against and operated by said cams for moving said web breaker, and means for yieldingly suspending said breaker for relieving the pressure of said power-transmitting mechanism on said cams.

32. In a machine of the character described, a web-forming mechanism, a web breaker suspended from a support, means for raising and lowering said support to move said breaker into and out of operating position, and means for bodily adjusting said support toward and from said raising and lowering means.

33. In a machine of the character described, a web-forming mechanism, a web breaker extending across the web and adapted to be engaged therewith, a movable support having said breaker suspended from the end portions thereof, springs by which said support is yieldingly supported, operating rods to which said support is attached at its ends, and means for bodily moving said support along said operating rods.

34. In a machine of the character described, a web-forming mechanism, a web breaker extending across the web and adapted to be engaged therewith, a movable support having said breaker suspended from the end portions thereof, springs by which a portion of the weight of said support and breaker is yieldingly supported, operating rods to which said support is attached at its ends, and rack and pinion mechanism for moving both ends of said support simultaneously along said operating rods.

35. In a machine of the character described, a web-forming mechanism including a cylinder mold, a making felt normally receiving the formed web from the cylinder mold, a mandrel to which the web is supplied by the making felt for winding a tube thereon, a breaker for removing the web from the cylinder mold to interrupt the supply of web to the making felt, and mechanism automatically controlled by the thickness of the tube wall for automatically operating the breaker.

36. In a machine of the character described, a web-forming mechanism including a cylinder mold, a making felt normally receiving the formed web from the cylinder mold, a mandrel to which the web is supplied by the making felt for winding a tube thereon, a breaker felt, mechanism for moving the breaker felt into engagement with the web formed on the cylinder mold, and means adjacent the engagement of said felt and web to conduct away the water expressed from said web.

37. In a machine of the character described, a cylinder mold, two separate mandrels, two conveyers for alternately receiving web formed on said cylinder mold and conveying said webs to said mandrels, and one of said conveyers being movable into and out of engagement with the formed web on the cylinder mold.

38. In a machine for making fiber tubular bodies, web-forming mechanism, two separate winding mechanisms, separate means associated respectively with said winding mechanisms for removing web from said web-forming mechanism and delivering it to said winding mechanisms, and means for causing said web-removing means to act alternately in removing web from said web-forming mechanism.

39. In a machine for making fiber tubular bodies, web-forming mechanism, two separate winding mechanisms, means for removing web from said forming mechanism and delivering it to one of said winding mechanisms, and means for interrupting said removal of web from said forming mechanism and thereafter delivering it to the other winding mechanism.

40. In a machine of the character described, a rotary cylinder mold, a conveyer for removing the web from said mold, and a web breaker movable into engagement with the cylinder mold in a direction generally opposite the direction of travel of that part of the cylinder mold with which it is engaged.

41. In a machine of the character described, a rotary cylinder mold, a conveyer for removing the web from said mold, a web breaker movable into engagement with the cylinder mold, and means for moving said breaker into and out of operative positions relatively to said cylinder mold and for holding it at rest in each position.

42. That improvement in the art of forming tubes by winding a web of wet pulp on to a mandrel, which comprises forming the pulp into a web of low stock concentration on a web-forming member, transferring said web to a conveyor, expressing water from said web and delivering it to said mandrel, and before the winding is completed breaking or interrupting the web on the web-forming member.

43. That improvement in the art of forming tubes by winding a web of wet pulp on to a mandrel, which consists in forming the pulp into a web on a moving cylindrical support as it passes through aqueous pulp, and before the winding of the tube is completed breaking or interrupting the formed web while on said moving cylindrical support.

44. That improvement in the art of forming tubes by winding a web of wet pulp on to a mandrel, which consists in forming the pulp into a web of low stock concentration on a rotating cylinder mold partly immersed in aqueous pulp so that it is incapable of sustaining its own weight, removing the water from the web and winding it when relatively highly concentrated into a tube, and before the tube is completely wound breaking or interrupting the web at a point on said cylinder mold where it is of said low stock concentration.

45. That improvement in the art of forming tubular bodies by winding a web of wet pulp upon a mandrel, which comprises forming a web of pulp upon a cylinder mold and transferring it to and winding it upon a mandrel, and before the winding is completed removing the formed web from the cylinder mold and delivering it to some point other than to the mandrel, thereby interrupting the supply of web to said mandrel.

46. That improvement in the art of forming tubular bodies by winding a web of wet pulp upon a mandrel, which comprises forming a web of pulp having a stock concentration of about 2% to 3%, removing the water from said web and delivering it for winding on the mandrel when it has a stock concentration of about 20%, and, when the winding of the tube is nearly completed, interrupting the web at that point where it has said first-mentioned low stock concentration.

47. In a machine of the character described, automatic mechanism for moving mandrels successively into a winding position for the winding of a web of wet pulp thereon, a web-forming mechanism, a conveyer for delivering the web to the mandrel, a web breaker for removing the formed web from the forming mechanism and thereby interrupting the supply of web to said mandrel, and mechanism controlled by the thickness of stock on said mandrel for operating said breaker prior to the removal of said mandrel from its winding position.

In testimony whereof I have affixed my signature.

HOWARD PARKER.